(12) United States Patent
Tang et al.

(10) Patent No.: US 11,132,372 B2
(45) Date of Patent: Sep. 28, 2021

(54) METHOD AND APPARATUS FOR PRECISE POSITIONING OF SCHOLAR BASED ON MINING OF SCHOLAR'S SCIENTIFIC RESEARCH ACHIEVEMENT

(71) Applicant: Tsinghua University, Beijing (CN)

(72) Inventors: Jie Tang, Beijing (CN); Zhou Shao, Beijing (CN); Bo Gao, Beijing (CN); Debing Liu, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 295 days.

(21) Appl. No.: 16/432,903

(22) Filed: Jun. 5, 2019

(65) Prior Publication Data

US 2020/0104298 A1  Apr. 2, 2020

(30) Foreign Application Priority Data

Sep. 29, 2018 (CN) .......................... 201811149733.6

(51) Int. Cl.
| | |
|---|---|
| *G06F 16/00* | (2019.01) |
| *G06F 16/2458* | (2019.01) |
| *G06F 16/28* | (2019.01) |
| *G06F 16/9537* | (2019.01) |
| *G06F 16/2457* | (2019.01) |
| *G06F 16/29* | (2019.01) |
| *G06F 9/54* | (2006.01) |

(52) U.S. Cl.
CPC ............ *G06F 16/2465* (2019.01); *G06F 9/54* (2013.01); *G06F 16/24578* (2019.01); *G06F 16/285* (2019.01); *G06F 16/29* (2019.01); *G06F 16/9537* (2019.01); *G06F 2216/03* (2013.01)

(58) Field of Classification Search
None
See application file for complete search history.

(56) References Cited

U.S. PATENT DOCUMENTS

| 9,177,013 | B2 * | 11/2015 | Rollins | ................. G06F 40/205 |
| 2008/0320579 | A1 * | 12/2008 | Rollins | ................. G06F 40/166 |
| | | | | 726/10 |

(Continued)

OTHER PUBLICATIONS

Study on information recommendation of scientific and technological achievements based on user behavior modeling and big data mining, IEEE, Li Xiaohui (Year: 2018).*

(Continued)

*Primary Examiner* — Jean M Corrielus
(74) *Attorney, Agent, or Firm* — Hodgson Russ LLP

(57) ABSTRACT

The present disclosure provides a method and an apparatus for precise positioning of a scholar based on mining of the scholar's scientific research achievement. The method includes: extracting text information in the scholar's scientific research achievement P to obtain key information, and constructing structural information; mining and constructing implicit information O with a geographic directivity in the scholar's scientific research achievement P according to the key information and the structural information; performing a structural arrangement on the structural information, and acquiring a final result R; and acquiring a mapping of A→R according to the final result R and the matrix U, acquiring and outputting the positioning information of the authors in the set A.

8 Claims, 4 Drawing Sheets

(56) References Cited

U.S. PATENT DOCUMENTS

2014/0006424 A1\* 1/2014 Al-Kofahi .............. G06F 16/00
707/754
2014/0172832 A1\* 6/2014 Rollins ................ G06F 16/434
707/722

OTHER PUBLICATIONS

Big Scholarly Data—A Survey, IEEE, Xia et al., (Year: 2017).\*
Finding topic-level experts in scholarly networks, Lin et al., (Year: 2013).\*

\* cited by examiner

METHOD AND APPARATUS FOR PRECISE POSITIONING OF SCHOLAR BASED ON MINING OF SCHOLAR'S SCIENTIFIC RESEARCH ACHIEVEMENT

CROSS-REFERENCE TO RELATED APPLICATION

The present application claims priority to Chinese Patent Application No. 201811149733.6, filed Sep. 29, 2018, the entire disclosure of which is incorporated herein by reference.

TECHNICAL FIELD

The present disclosure relates to a field of positioning technology, in particular to a method and an apparatus for precise positioning of a scholar based on the scholar's scientific research achievement mining.

BACKGROUND

The specific nature of the scholar's scientific research achievement determines its high reliability, and the scholar's scientific research achievement contains the time/space related information of the scholar. It provides the possibility to locate the scholar according to the scholar's scientific research achievement. Precise positioning based on a complex text (such as information of the scholar's affiliation) has always been a problem, and there are many ways to achieve the positioning but appearing inconsistency in several aspects.

The scholar's scientific research achievement has a series of characteristics such as authenticity, accuracy, non-anonymity and preciseness. Therefore, the information of the scholar's scientific research achievement has a high reliability. The scholar's scientific research achievement contains information on research activities of the scholar at specific times, specific places, and specific fields. In terms of general scientific research achievements such as papers and patents, basic information of the scholar such as the name, unit (such as a company or a college), time, and research content will be contained. Extracting information in the scholar's research paper may complete the association between the time and space of the scholar. On this basis, the scholar's positioning may be achieved by completing the mapping of the scholar's unit and geographic location information using the map API. However, due to the unstructured and diverse writing manners of text information of the scholar's scientific research achievement, it is quite difficult to extract unit information with single and clear semantics. The obtained scholar's affiliation information usually contains relatively large amount of information, more useless information, less prominent information, more interference information, and usually has problems such as information loss, ambiguity, and multi-language, leading to difficulties to achieve precise positioning of the scholars.

Traditional maps have achieved functions of implementing mapping of strings to geographic location information. For example, Google achieves a function of parsing terms inputted from a user for map search into location portions for indicating location information in the inputted search terms. Baidu achieves a function of performing a word segment on the user's inputted query and extracting specific information related to the user's needs in the segmented results, and then extracting the corresponding information from the specific information. Qihoo achieves that a query style corresponding to the query may be determined based on the statement inputted by the user, and then a map relevance score of the query may be determined according to the query style, and then it is determined whether to display an electronic map related to the query according to the map relevance score. Tencent achieves a function of sorting according to the frequency of the internal map data in the interest point database and the number of query results searched by the search engine, which improves the coverage and accuracy of the map data importance. Microsoft achieves a transformation and processing on a multi-language query, thereby improving processing accuracy in multi-language environments.

The above methods improve the accuracy of the results obtained by the user's inputted query to some extent. However, the particularity of the scholar's affiliation information in the scholar's scientific research achievement is not considered, such that a considerable part of the data cannot be used to obtain the geographical location information results, and there is significant deviation among the obtained results. Using the paper data on Aminer, a well-known technology big data mining service platform in China, the results show that the recall rate by using the map API to directly acquire the mapping between the geographic information scholar's affiliation information is 50%, and the correct rate is lower than 80%.

Due to the difference in constructions of address information base by different maps, the situations of address recording among them are inconsistent, the weights of search keywords are different, and the orders of search results are different, leading to a difference in the results of querying a same string. For example, when a query "Northwest University" is inputted and Baidu map API and Google map API are invoked respectively, the positioning result of Baidu map is: {"lng":108.9342237431768, "lat": 34.25373435757479}, the positioning result of Google map is: {"lat": 42.0564594, "lng": -87.67526699999999}, one of which is in China and another one is in the United States. Extracting the country of the scholar from the paper may achieve a correct processing of the information.

SUMMARY

The present disclosure aims to solve at least one of the technical problems in the related art to some extent.

To this end, an objective of the present disclosure is to propose a method for precise positioning of a scholar based on mining of the scholar's scientific research achievement.

Another objective of the present disclosure is to provide an apparatus for precise positioning of a scholar based on mining of the scholar's scientific research achievement.

In order to achieve the above objectives, an embodiment of the present disclosure provides a method for precise positioning of a scholar based on mining of the scholar's scientific research achievement. The method may include: extracting text information in the scholar's scientific research achievement P to obtain key information, and constructing structural information comprising a set A of authors in the scholar's scientific research achievement P, a set B of the scholar's affiliation information, and a matrix U representing of A→B; mining and constructing implicit information O with a geographic directivity in the scholar's scientific research achievement P according to the key information and the structural information; performing a structural arrangement on the structural information according to importance degrees of parts in the structural information affecting positioning information of the authors in the scholar's scientific research achievement P, and acquiring a final result R according to the implicit information O and API characteristics of different maps; and acquiring a mapping of A→R according to the final result R and the matrix U, acquiring and outputting the positioning information of the authors in the set A.

In order to achieve the above objectives, an embodiment of the present disclosure provides an apparatus for precise positioning of a scholar based on mining of the scholar's scientific research achievement. The apparatus may include one or more processors, and a memory storing instructions executable by the one or more processors, in which the one or more processors are configured to: extract text information in the scholar's scientific research achievement P to obtain key information, and construct structural information comprising a set A of authors in the scholar's scientific research achievement P, a set B of the scholar's affiliation information, and a matrix U representing of A→B; mine and construct implicit information O with a geographic directivity in the scholar's scientific research achievement P according to the key information and the structural information; perform a structural arrangement on the structural information according to importance degrees of parts in the structural information affecting positioning information of the authors in the scholar's scientific research achievement P, and to acquire a final result R according to the implicit information O and API characteristics of different maps; and acquire a mapping of A→R according to the final result R and the matrix U, acquire and output the positioning information of the authors in the set A.

The additional aspects and advantages of the disclosure will be set forth in part in the description which follows.

BRIEF DESCRIPTION OF THE DRAWINGS

The above and/or additional aspects and advantages of the present disclosure will become apparent and readily understood from the following description, in which.

DETAILED DESCRIPTION

Figure 1:
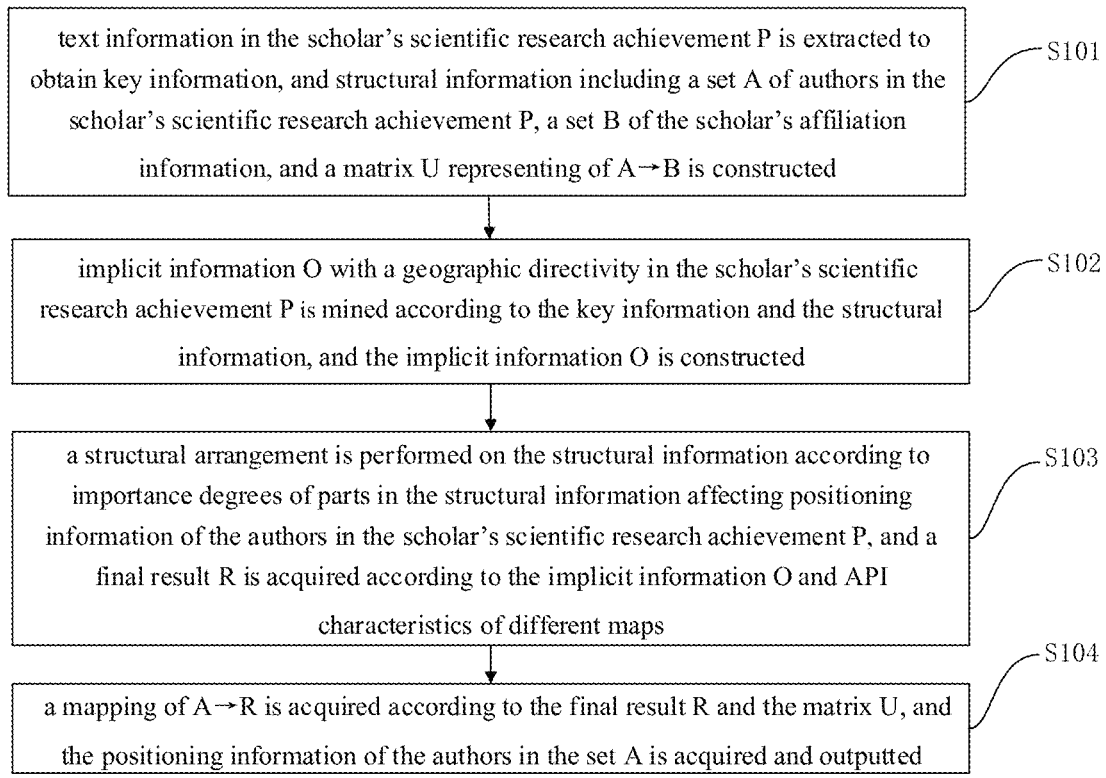
FIG. 1 is a flow chart of a method for precise positioning of a scholar based on mining of the scholar's scientific research achievement according to an embodiment of the present disclosure.

The embodiments of the present disclosure are described in detail below, and the examples of the embodiments are illustrated in the drawings, in which the same or similar reference numerals are used to refer to the same or similar elements or elements having the same or similar functions. The embodiments described below with reference to the drawings are intended to be illustrative of the present disclosure and are not to be construed as limitations.

The method and apparatus for precise positioning of a scholar based on mining of the scholar's scientific research achievement according to embodiments of the present disclosure will be described below with reference to the accompanying drawings. Firstly, the method for precise positioning of a scholar based on mining of the scholar's scientific research achievement according to an embodiment of the present disclosure will be described with reference to the accompanying drawings.

FIG. 1 is a flow chart of a method for precise positioning of a scholar based on mining of the scholar's scientific research achievement according to an embodiment of the present disclosure.

As illustrated in FIG. 1, the method may include followings.

At block S101, text information in the scholar's scientific research achievement P is extracted to obtain key information, and structural information is constructed, in which the structural information may include a set A of authors in the scholar's scientific research achievement P, a set B of the scholar's affiliation information, and a matrix U representing of A→B.

At block S102, implicit information O with a geographic directivity in the scholar's scientific research achievement P is mined according to the key information and the structural information, and the implicit information O is constructed.

At block S103, a structural arrangement is performed on the structural information according to importance degrees of parts in the structural information affecting positioning information of the authors in the scholar's scientific research achievement P, and a final result R is acquired according to the implicit information O and API characteristics of different maps.

Further, in an embodiment of the present disclosure, an inputting preprocessing is performed on the set B, strings of the scholar's affiliation information in the set B are acquired, and a cleaning, a filtering, and the structural arrangement are performed according to weights of the strings. A structural rotation querying is performed on the strings using the API characteristics of different maps, and when a query result is NULL, a string with a low weight from the strings is discarded, until the query result is not NULL. A difference between query results acquired using the API characteristics of different maps are acquired, and it is determined whether the difference exceeds a difference threshold. When the difference exceeds the difference threshold, a reliability determination is performed on the query results based on the structural implicit information O to acquire the final result R, and when the difference does not exceed the difference threshold, a query result acquired by a map with a highest reliability is determined as the final result R.

Performing the reliability determination on the query results based on the structural implicit information O to acquire the final result R may include: computing weights of the maps used for acquiring the query results according to the structural implicit information O, and determining a query result acquired by using a map with a highest weight as the final result R. Determining the query result acquired by the map with the highest reliability as the final result R may include: determining the map which has the highest reliability in a preset region corresponding to the query results acquired using the API characteristics of different maps, and determining the query result acquired by the map with the highest reliability as the final result R.

At block S104, a mapping of A→R is acquired according to the final result R and the matrix U, and the positioning information of the authors in the set A is acquired and outputted.

Further, in an embodiment of the present disclosure, it is determined whether the scholar's scientific research achievement P is a structural text; if yes, a category of each part of the scholar's scientific research achievement P is identified; otherwise, the text information in the scholar's scientific research achievement P is extracted and the structural information is constructed.

Further, in one embodiment of the disclosure, the implicit information O with the geographic directivity may include a language lang used in the scholar's scientific research achievement P, postal code information code, and information repeated in or associated with the set B.

Figure 2:
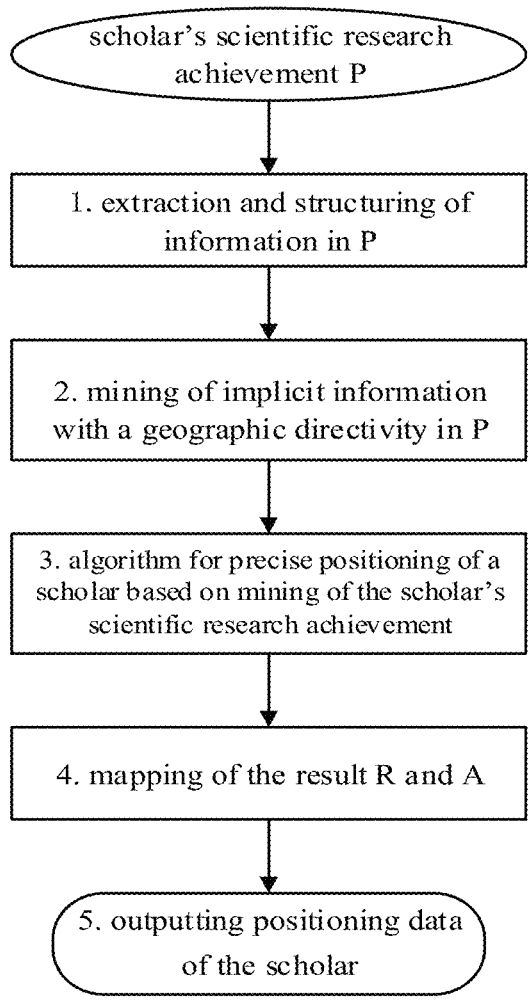
FIG. 2 is a flow chart of a method for precise positioning of a scholar based on mining of the scholar's scientific research achievement according to a specific embodiment of the present disclosure.

As illustrated in FIG. 2, a scholar's scientific research paper is takes as an example in the embodiment of the present disclosure to describe how to realize the positioning of the scholar through the scholar's scientific research achievement, and how to realize a precise mapping of the scholar's scientific research achievement to the geographical location information through the scholar's precise positioning algorithm based on mining of the scholar's scientific research achievement. In the embodiments of the present disclosure, a paper P is taken as an example of the scholar's a scientific research achievement, and a deep mining of P and a full utilization of different types of maps are achieved by using the technology in the algorithm, and a mapping of an author set A and a geographic information set B in the P is constructed and outputted.

Specifically, text information of a scholar's scientific research achievement such as a paper is inputted. The method is performed as followings.

In step 1, extraction and structuring of information in P are performed.

Text information in P is extracted to obtain useful key information, and structural information such as a set A of authors in P, a set B of the scholar's affiliation information, and a matrix U representing of A→B is constructed.

In step 2, implicit information with a geographic directivity in P is mined.

On the basis of step 1, the implicit information with the geographical directivity is mined, and the structural implicit information O related to P is constructed.

In step 3, a calculation is performed based on a multi-map scholar precise positioning algorithm.

A structural arrangement is performing on B in the step 1 according to importance degrees of parts in B affecting positioning information of the authors in P, operations such as querying, calculation of reliability degree of the result and calculation of the outputting result are performed according to the algorithm, and a final result R is outputted.

In step 4, a mapping of the result R and A is performed.

The mapping of A→R is acquired according to R and U, geographic location information of each author $a_i$ in the set A of P is acquired, and the geographic location information is outputted as positioning information of authors in the set A of P.

The method for precise positioning of a scholar based on mining of the scholar's scientific research achievement of the present disclosure will be described in detail below with reference to specific embodiments.

Specifically, taking a scholar's paper as an input as an example to illustrate how the embodiment of the present disclosure achieves accurate positioning of the scholar through the information of the scholar's scientific research achievement. The paper is a readable text, which is represented as P. At the same time, the following definitions are made: a set of the authors in the paper is represented as A, in which the authors are in an order of $a_1, \ldots a_i, \ldots$, a set of the affiliations of the authors in P is represented as B, in which the affiliations are in an order of $b_1, \ldots b_i, \ldots$, and there is a certain correspondence between A and B, which is represented by a 0-1 matrix U, and the ordinal numbers of rows in the matrix correspond to elements in A respectively, and the ordinal numbers of columns in the matrix correspond to elements in B. An element on the $i^{th}$ row and $j^{th}$ column in U is represented as $u_{ij}$, $u_{ij}=1$ means that the $i^{th}$ author belongs to the $j^{th}$ institution, and $u_{ij}=0$ means that the $i^{th}$ author does not belong to the $j^{th}$ institution.

Without using the method of the embodiment of the present disclosure, different map APIs are directly invoked to perform the mapping, and using the API of a certain map m (where m represents the name of the map) is represented as $f_m$. For example, using Baidu map API is represented as $f_{baidu}$, using Google map API is represented as $f_{google}$, and using Bing map API is represented as $f_{bing}$. A result of mapping a single string (such as $b_1$) to geographic location information is represented as $r_m$. If the input is an array of strings (such as B), the corresponding result is $R_m$. The embodiment of the present disclosure uses a method $f_0$, in which results of the above-mentioned $f_{baidu}$, $f_{google}$ and $f_{bing}$ are used, and the result of $f_0$ is r or R. The mapping of B→R in P is completed by the design of $f_0$, thereby achieving the poisoning of A.

Further, in order to acquire R to achieve the positioning of A in P, the embodiment of the present disclosure designs a method for precise positioning of a scholar based on mining of the scholar's scientific research achievement. In order to achieve an improvement of the recall rate and the accuracy rate of Ro, the embodiment of the present disclosure also designs an algorithm for precise positioning of a scholar based on mining of the scholar's scientific research achievement. The basic ideas are described as follows.

In the method for precise positioning of a scholar based on mining of the scholar's scientific research achievement, an extraction, a structural construction and an implicit information mining are performed on the information in P, a mapping A→B is established, and B is determined as an input of the algorithm for precise positioning of a scholar based on multiple maps to obtain a result of the mapping of the string to the geographic location information. Finally, the positioning of A in P is completed through the matrix U of A and B.

In the algorithm for precise positioning of a scholar based on mining of the scholar's scientific research achievement, based on the existing mapping method $f_m$, a cleaning, a filtering, and a structural arrangement are performed on the inputted B according to information importance (input preprocessing), and then $f_m$ is used to perform a structural rotation querying, and reliability values of $R_m$ are calculated according to the characteristics of the map API mapping methods and O. Finally, an adaptive weight calculation method is used to calculate the final geographic location mapping result R according to the reliability values of the results. The specific steps are described as follows.

In step 1, extraction and structuring of information in P are performed.

If P is a structural text, it only needs to identify a category of each part of the structural text. If P is an unstructured text, it needs to use common techniques and methods such as a regular expression method (e.g., "(?UNIVERSITY OF[\s\w]+)" represents a regular expression of extracting the unit of "UNIVERSITY OF XXX") to perform the extraction and structuring on the information in P, and finally, based on this, structural information of A, B and the matrix U representing A→B and the like may be constructed.

In step 2, implicit information with a geographic directivity in P is mined.

The geographical directivity refers to some information in the paper that may be helpful to determine the region of the author, such as a language lang used in the paper, postal code information code, amd information repeated in or associated with the set B and the like, thereby forming a set O which is represented as O={code, lang, . . . }.

Figure 3:
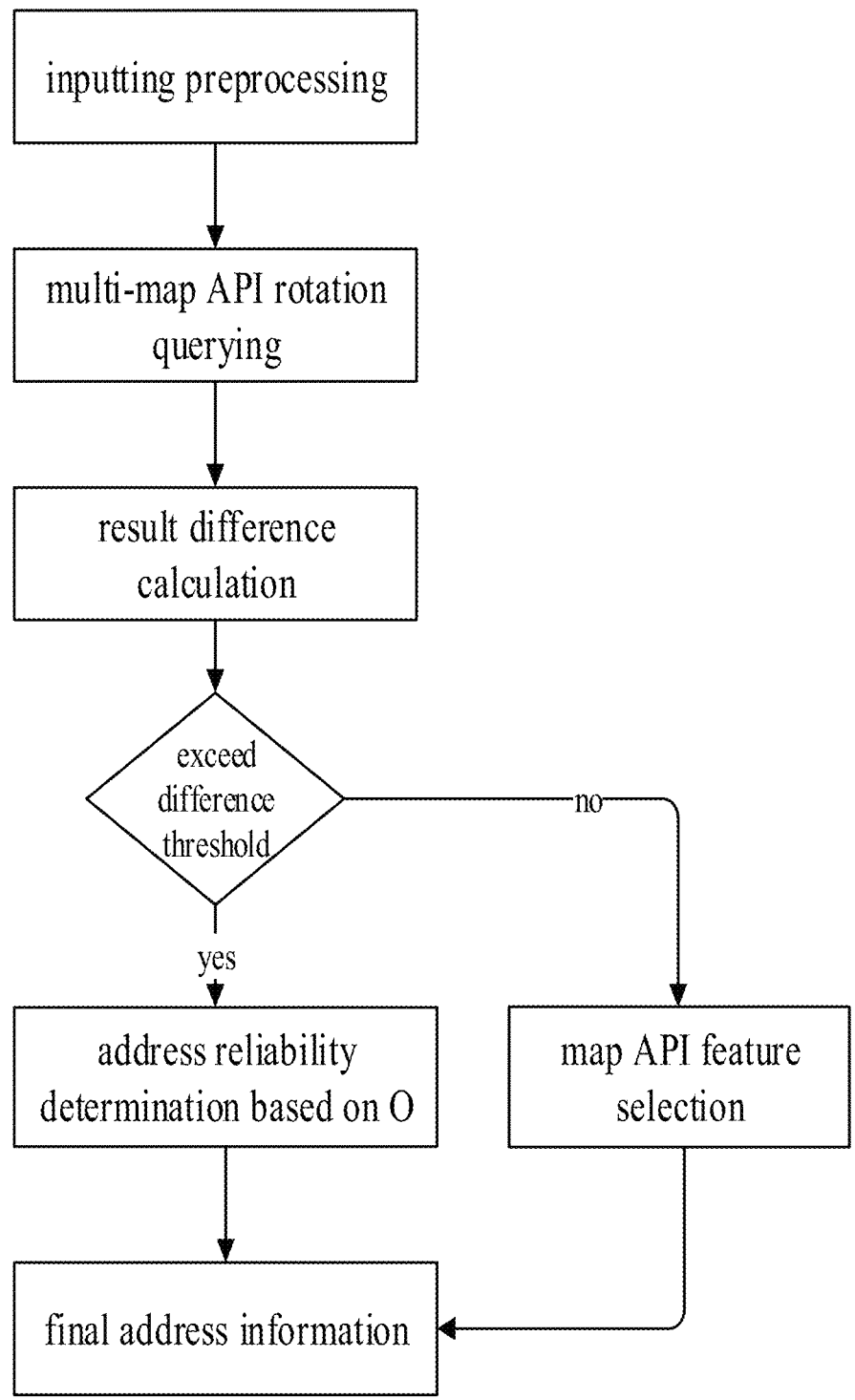
FIG. 3 is a flow chart of a method for precise positioning of a scholar based on mining of the scholar's scientific research achievement according to an embodiment of the present disclosure.

In step 3, the algorithm for precise positioning of a scholar based on mining of the scholar's scientific research achievement is performed, as shown in FIG. 3.

Input preprocessing: an input preprocessing is performed on B, and a cleaning, a filtering, and a structural arrangement are performed on according to information importance. For example, for an affiliation of "Present address: Department of Health, Physical Education and Recreation, Northern Michigan University, 1401 Presque Isle Avenue, Marquette, Mich. 49855, USA. dkane@nmu.edu", according to the regular expression, the irrelevant information "dkane@nmu.edu", "Present address:" are cleared according to the regular expression, and the string "Northern Michigan University, Department of Health, Physical Education and Recreation, 1401 Presque Isle Avenue, Marquette, Mich. 49855, USA", which is sorted according to the importance, is constructed according to the multi-level keyword library.

Figure 4:
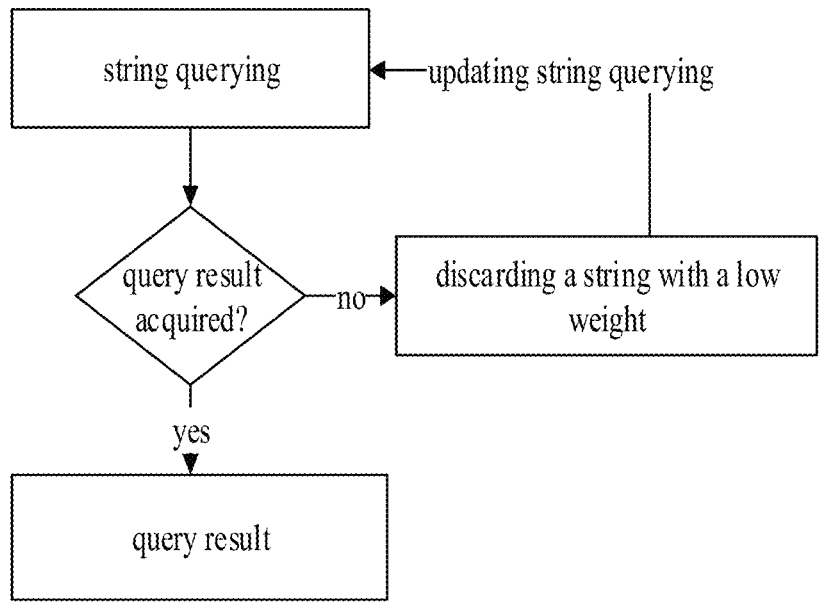
FIG. 4 is a schematic diagram of multi-map API rotation querying according to an embodiment of the present disclosure.

Multi-map API rotation querying: as shown in FIG. 4, according to the previously constructed string, a structural rotation querying is performed by using multiple different types of $f_m$. When a query result is NULL, a string with a low weight is discarded until the query result is not NULL. For example, a querying order of the above string is: "Northern Michigan University, Department of Health, Physical Education and Recreation, 1401 Presque Isle Avenue, Marquette, Mich. 49855, USA", . . . , "Northern Michigan University, Department of Health, Physical Education and Recreation", "Northern Michigan University".

Result difference calculation: since different maps use different coding manners, for example, Google map and Bing map use GCJ-02 coordinates, but Baidu map uses BD-09 coordinates. Therefore, the BD-09 coordinates needed to be converted to the GCJ-02 coordinates. After that, a sum s of an absolute value of a difference between longitudes of respective two results of $r_m$ and an absolute value of a difference between latitudes of respective two results of $r_m$ is calculated respectively.

Difference threshold determination: the difference threshold is set as λ, which is set as 0.001 in general. When s>λ, it means that there is a significant difference in the results obtained by different map APIs, and the reliability determination stage based on the implicit information O with a geographic directivity starts. In other words, a reliability determination is performed on the query results based on the implicit information O to acquire the final result R. When s≤λ, it means that there is no significant difference in the results obtained by using different map APIs, and a map API feature selection stage starts. In other words, a query result acquired by a map with a highest reliability is determined as the final result R.

Reliability determination stage based on the implicit information O with a geographic directivity: reliability weights of the results are determined according to the implicit information O including a language lang used in the paper, postal code information code, and information repeated in or associated with the set B, a weight of the API of the map m is represented as $\mu_m$, which is initialized to 0. When explicit information with geographic directivity is included in O, the weight is added by 0.1 until all of the information in O is matched. Generally, three or more map APIs are used, such as Baidu map, Google map and Bing map, and the corresponding weights are $\mu_{baidu}$, $\mu_{google}$ and $\mu_{bing}$. The respective weight values are calculated separately, and finally the result with the highest weight is returned.

Map API feature selection stage: different maps have their own advantages in the construction and query of the address information database, and the results returned by different maps may be in different regions, such that the reliabilities of the results are also different. For example, if the returned address is in China, the reliability of $r_{baidu}$ is higher, and $r_{baidu}$ is the preferred result.

Final address information: if the reliability determination stage based on the implicit information O with a geographic directivity starts, the result acquired after the structural rotation querying is performed is determined as the final result. In other words, performing the reliability determination on the query results based on the structural implicit information O to acquire the final result R may include: computing weights of the maps used for acquiring the query results according to the structural implicit information O, and determining a query result acquired by using a map with a highest weight as the final result R. If the map API feature selection stage starts, the result acquired by the map with the highest reliability is determined as the final result. In other words, determining the query result acquired by the map with the highest reliability as the final result R may include: determining the map which has the highest reliability in a preset region corresponding to the query results acquired using the API characteristics of different maps, and determining the query result acquired by the map with the highest reliability as the final result R.

In step 4, a mapping of the result R and A is performed.

A simple matrix operation L=RU is performed according to the obtained result R and the mapping matrix U of A→B, and the mapping of A→R is achieved, and the geographical location information of each scholar $a_i$ in P is obtained.

Specifically, in the embodiment of the present disclosure, the method is applied to the famous domestic technology big data mining service platform Aminer to locate 130 million scholars of 230 million papers, and the positioning of most scholars are successfully completed, which means that the embodiments of the present disclosure is feasible. An accurate positioning experiment is realized using the affiliation information of some scholars with centralized data, such that the validity and accuracy of the method are proved. The detail description is made as follows.

In a first group, a string-based rotation querying for positioning the scholar is performed using the existing maps (such as Baidu map, Google map, Bing map, and Gaode map), in which B corresponding to A in P is regarded as the input, and results $R_{baidu}$, $R_{google}$, $R_{bing}$ and $R_{gaode}$ are acquired.

In a second group, an experiment is conducted by using the method for precise positioning of a scholar based on mining of the scholar's scientific research achievement proposed in the embodiments of the present disclosure, and importance information such as difference among the implicit information O in the paper, $f_{baidu}$, $f_{google}$, $f_{bing}$ and $f_{gaode}$ on the address information base construction, importance degrees of the query results including $R_{baidu}$, $R_{google}$, $R_{bing}$ and $R_{gaode}$ are fully used, and the result R is finally acquired.

The above results show that, based on the above data set, the recall rate of the second group of results reaches 91.72%, which is more than 40% higher than the recall rate of the first group, the accuracy rate of the second group of results reaches 98.34%, which is increased by more than 20% compared to the first group, which shows the superiority of the method for precise positioning of a scholar based on mining of the scholar's scientific research achievement.

With the method for precise positioning of a scholar based on mining of the scholar's scientific research achievement proposed in embodiments of the present disclosure, by performing a deep mining on the text information of the scholar's scientific research achievement, constructing the implicit information with a geographic directivity, determining difference results returned by different map API using an adaptive weight calculation method, a precise mapping of the scholar's scientific research achievement to the scholar's geographic location information may be achieved effectively and accurately.

Next, an apparatus for precise positioning of a scholar based on mining of the scholar's scientific research achievement according to an embodiment of the present disclosure will be described with reference to the accompanying drawings.

Figure 5:
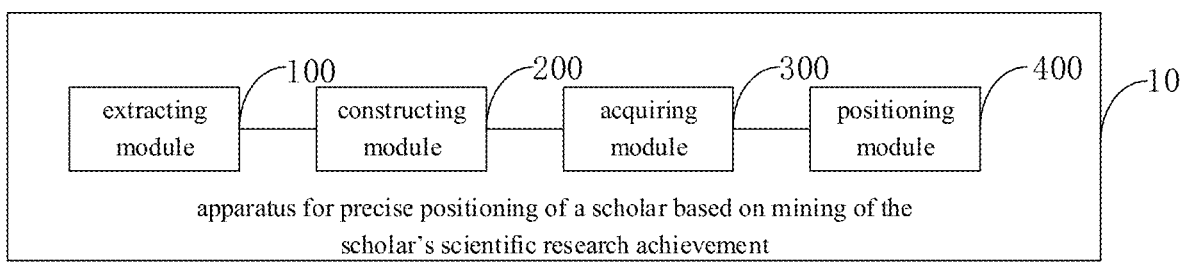
FIG. 5 is a schematic structural diagram of an apparatus for precise positioning of a scholar based on mining of the scholar's scientific research achievement according to an embodiment of the present disclosure.

FIG. 5 is a schematic structural diagram of an apparatus for precise positioning of a scholar based on mining of the scholar's scientific research achievement according to an embodiment of the present disclosure.

As shown in FIG. 5, the apparatus 10 includes: an extracting module 100, a constructing module 200, an acquiring module 300, and a positioning module 400.

The extracting module 100 is configured to extract text information in the scholar's scientific research achievement P to obtain key information, and construct structural information comprising a set A of authors in the scholar's scientific research achievement P, a set B of the scholar's affiliation information, and a matrix U representing of A→B. The constructing module 200 is configured to mine and construct implicit information O with a geographic directivity in the scholar's scientific research achievement P according to the key information and the structural information. The acquiring module 300 is configured to perform a structural arrangement on the structural information according to importance degrees of parts in the structural information affecting positioning information of the authors in the scholar's scientific research achievement P, and to acquire a final result R according to the implicit information O and API characteristics of different maps. The positioning module 400 is configured to acquire a mapping of A→R according to the final result R and the matrix U, acquire and output the positioning information of the authors in the set A. With the apparatus 10 proposed in embodiments of the present disclosure, by performing a deep mining on the text information of the scholar's scientific research achievement, constructing the implicit information with a geographic directivity, determining difference results returned by different map API using an adaptive weight calculation method, an effective and precise positioning result may be acquired.

Further, in an embodiment of the present disclosure, the apparatus 10 also includes: a determining module, configured to determine whether the scholar's scientific research achievement P is a structural text; and an identifying module, configured to identifying a category of each part of the scholar's scientific research achievement P when it is determined that the scholar's scientific research achievement P is the structural text, and the extracting module being configured to extract the text information in the scholar's scientific research achievement P and to construct the structural information when it is determined that the scholar's scientific research achievement P is not the structural text.

Further, in an embodiment of the present disclosure, the implicit information with the geographic directivity comprises a language lang used in the scholar's scientific research achievement P, postal code information code, and information repeated of or associated with information in the set B.

Further, in an embodiment of the present disclosure, the acquiring module 300 is also configured to: perform an inputting preprocessing on the set B, acquire strings of the scholar's affiliation information in the set B, and perform a cleaning, a filtering, and the structural arrangement according to weights of the strings; perform a structural rotation querying on the strings using the API characteristics of different maps, and when a query result is NULL, discard a string with a low weight from the strings until the query result is not NULL; acquire differences between query results acquired using the API characteristics of different maps, and determine whether the difference exceeds a difference threshold; when the difference exceeds the difference threshold, perform a reliability determination on the query results based on the structural implicit information O to acquire the final result R, and when the difference does not exceed the difference threshold, determine a query result acquired by a map with a highest reliability as the final result R.

In an embodiment, the acquiring module 300 performs the reliability determination on the query results based on the structural implicit information O to acquire the final result R by performing acts of: computing weights of the maps used for acquiring the query results according to the structural implicit information O, and determining a query result acquired by using a map with a highest weight as the final result R; and the acquiring module 300 determines the query result acquired by the map with the highest reliability as the final result R by performing acts of: determining the map which has the highest reliability in a preset region corresponding to the query results acquired using the API characteristics of different maps, and determining the query result acquired by the map with the highest reliability as the final result R.

It should be noted that the foregoing explanation of the embodiment of the method for precise positioning of a scholar based on mining of the scholar's scientific research achievement is also applicable to the embodiment of the apparatus, and details are not described herein again.

With the apparatus for precise positioning of a scholar based on mining of the scholar's scientific research achievement proposed in embodiments of the present disclosure, by performing a deep mining on the text information of the scholar's scientific research achievement, constructing the implicit information with a geographic directivity, determining difference results returned by different map API using an adaptive weight calculation method, a precise mapping of the scholar's scientific research achievement to the scholar's geographic location information may be achieved effectively and accurately.

Moreover, the terms "first" and "second" are merely used for descriptive purposes and are not to be construed as indicating or implying a relative importance or implicitly indicating the number of technical features indicated. Thus, features defined with "first" and "second" may include at least one of the features, either explicitly or implicitly. In the description of the present disclosure, the meaning of "a plurality" is at least two, such as two, three, etc., unless specifically defined otherwise.

In the description of the present specification, the description with reference to the terms "one embodiment", "some embodiments", "example", "specific example", or "some examples" and the like means a specific feature described in connection with the embodiment or example. A structure, material or feature is included in at least one embodiment or example of the present disclosure. In the present specification, the schematic representation of the above terms is not necessarily directed to the same embodiment or example. Furthermore, the particular features, structures, materials, or characteristics described may be combined in a suitable manner in any one or more embodiments or examples. In addition, various embodiments or examples described in the specification and features of various embodiments or examples may be combined and combined without departing from the scope of the disclosure.

Although the embodiments of the present disclosure have been illustrated and described, it should be understood that the above-described embodiments are illustrative and are not to be construed as limitations of the scope of the disclosure. For the skilled in the art, variations, modifications, substitutions and variations can be made without departing form the scope thereof

What is claimed is:

1. A method for precise positioning of a scholar based on mining of a scientific research achievement P of the scholar, comprising:
   extracting text information in the scientific research achievement P of the scholar to obtain key information, and constructing structural information comprising a set A of authors in the scientific research achievement P, a set B of affiliation information of the scholar, and a matrix U representing a mapping of A→B;
   mining and constructing implicit information O with a geographic directivity in the scientific research achievement P according to the key information and the structural information;
   performing a structural arrangement n the structural information according to importance degrees of parts in the structural information affecting positioning information of the authors in the scientific research achievement P, and acquiring a final result R according to the implicit information O and API characteristics of different maps; and
   acquiring a mapping of A→R according to the final result R and the matrix U, acquiring and outputting the positioning information of the authors in the set A,
   wherein performing the structural arrangement on the structural information comprises:
      performing an inputting preprocessing on the set B, acquiring strings of the affiliation information in the set B, and performing a cleaning, a filtering, and the structural arrangement according to weights of the strings;
      performing a structural rotation querying on the strings using the API characteristics of different maps, and when a query result is NULL, discarding a string with a low weight from the strings until the query result is not NULL;
      acquiring a difference between query results acquired using the API characteristics of different maps, and determining whether the difference exceeds a difference threshold; and
      when the difference exceeds the difference threshold, performing a reliability determination on the query results based on the implicit information O to acquire the final result R, and when the difference does not exceed the difference threshold, determining a query result acquired by a map with a highest reliability as the final result R.

2. The method according to claim 1, further comprising: determining whether the scientific research achievement P is a structural text; and
   when the scholar's scientific research achievement P is the structural text, identifying a category of each part of the scientific research achievement P, and when the scientific research achievement P is not the structural text, extracting the text information in the scientific research achievement P and constructing the structural information.

3. The method according to claim 1, wherein the implicit information O with the geographic directivity comprises a language lang used in the scientific research achievement P, postal code information code, and information repeated in or associated with the set B.

4. The method according to claim 1, wherein, performing the reliability determination on the query results based on the structural implicit information O to acquire the final result R comprises:
   computing weights of the maps used for acquiring the query results according to the structural implicit information O, and determining a query result acquired by using a map with a highest weight as the final result R; and
   determining the query result acquired by the map with the highest reliability as the final result R comprises: determining the map which has the highest reliability in a preset region corresponding to the query results acquired using the API characteristics of different maps, and determining the query result acquired by the map with the highest reliability as the final result R.

5. An apparatus for precise positioning of a scholar based on mining of a scientific research achievement P of the scholar, comprising:
   one or more processors; and
   a memory storing instructions executable by the one or more processors;
   wherein the one or more processors are configured to:
      extract text information in the scientific research achievement P of the scholar to obtain key information, and construct structural information comprising a set A of authors in the scientific research achievement P, a set B of affiliation information of the scholar, and a matrix U representing a mapping of A→B;
      mine and construct implicit information O with a geographic directivity in the scientific research achievement P according to the key information and the structural information;
      perform a structural arrangement on the structural information according to importance degrees of parts in the structural information affecting positioning information of the authors in the scientific research achievement P, and to acquire a final result R according to the implicit information O and API characteristics of different maps; and acquire a mapping of A→R according to the final result R and the matrix U, acquire and output the positioning information of the authors in the set A, wherein the one or more processors is configured to perform the structural arrangement on the structural information by performing acts of:

performing an inputting preprocessing on the set B, acquiring strings of the affiliation information in the set B, and performing a cleaning, a filtering, and the structural arrangement according to weights of the strings;

performing a structural rotation querying on the strings using the API characteristics of different maps, and when a query result is NULL, discarding a string with a low weight from the strings until the query result is not NULL;

acquiring differences between query results acquired using the API characteristics of different maps, and determining whether the difference exceeds a difference threshold; and when the difference exceeds the difference threshold, performing a reliability determination on the query results based on the structural implicit information O to acquire the final result R, and when the difference does not exceed the difference threshold, determining a query result acquired by a map with a highest reliability as the final result R.

6. The apparatus according to claim 5, wherein the one or more processors are configured to:

determine whether the scientific research achievement P is a structural text; and identify a category of each part of the scientific research achievement P when the scholar's scientific research achievement P is the structural text, and the one or more processors being configured to extract the text information in the scientific research achievement P and to construct the structural information when the scientific research achievement P is not the structural text.

7. The apparatus according to claim 5, wherein the implicit information with the geographic directivity comprises a language lang used in the scientific research achievement P, postal code information code, and information repeated of or associated with information in the set B.

8. The apparatus according to claim 5, wherein, the one or more processors is configured to perform the reliability determination on the query results based on the structural implicit information O to acquire the final result R by performing acts of: computing weights of the maps used for acquiring the query results according to the structural implicit information O, and determining a query result acquired by using a map with a highest weight as the final result R; and the one or more processors is configured to determine the query result acquired by the map with the highest reliability as the final result R by performing acts of: determining the map which has the highest reliability in a preset region corresponding to the query results acquired using the API characteristics of different maps, and determining the query result acquired by the map with the highest reliability as the final result R.

* * * * *